United States Patent [19]
Yumoto

[11] Patent Number: 5,655,888
[45] Date of Patent: Aug. 12, 1997

[54] PUMP AND COMBINATION PUMP AND TRAP WITH SNAP-OVER MECHANISM AND DOUBLE-SEAL OUTLET VALVE

[75] Inventor: Hideaki Yumoto, Kakogawa, Japan

[73] Assignee: TLV Co., Ltd., Hyogo, Japan

[21] Appl. No.: 529,966

[22] Filed: Sep. 19, 1995

[30] Foreign Application Priority Data

| Oct. 14, 1994 | [JP] | Japan | 6-275762 |
| Nov. 15, 1994 | [JP] | Japan | 6-306871 |
| Dec. 15, 1994 | [JP] | Japan | 6-333944 |
| Dec. 15, 1994 | [JP] | Japan | 6-333946 |
| Dec. 15, 1994 | [JP] | Japan | 6-333947 |
| Mar. 15, 1995 | [JP] | Japan | 7-084669 |
| Apr. 14, 1995 | [JP] | Japan | 7-113682 |

[51] Int. Cl.$^6$ ............................................. F04F 1/06
[52] U.S. Cl. .................................... 417/132; 417/133
[58] Field of Search .................................. 417/137, 133; 137/209

[56] References Cited

U.S. PATENT DOCUMENTS

| 1,699,464 | 1/1929 | Dutcher | 137/209 |
| 5,141,405 | 8/1992 | Francart, Jr. | 417/133 |
| 5,366,349 | 11/1994 | Ilg | 417/132 |
| 5,401,142 | 3/1995 | Yumoto | 417/132 |
| 5,445,501 | 8/1995 | Yumoto | 417/133 |

*Primary Examiner*—Charles G. Freay
*Attorney, Agent, or Firm*—Kenyon & Kenyon

[57] ABSTRACT

A combination pump and trap is disclosed which includes a snap-over mechanism useful for small floats with little buoyancy. The snap-over mechanism has a geometry in which the distance between the float or compression arm pivot point and the pivot for the portion of the spring connected to a first arm or toggle link is greater than the distance from the float or compression arm pivot point and the pivot for the portion of the spring connected to the float or compression arm. This geometry allows the magnification of buoyancy by the main arm which is transmitted to the first toggle link to be large and the magnification of buoyancy by the first toggle link which is transmitted to the change-over valve to be large. A trap which is connected to the float arm is also used, which allows a liquid seal to be maintained at the liquid discharge port. A double seal valve with a mechanism for allowing rapid opening of the valve upon movement of the float is also disclosed, as is a externally-cleanable working fluid feed valve.

27 Claims, 11 Drawing Sheets

PUMP AND COMBINATION PUMP AND TRAP WITH SNAP-OVER MECHANISM AND DOUBLE-SEAL OUTLET VALVE

BACKGROUND OF THE INVENTION

1. Field of the Invention

The present invention relates to a pump and trap for feeding a liquid such as water, fuel, etc. The pump and trap of the present invention is suitable particularly for use in collecting a condensate generated in a steam piping system and feeding this condensate to a boiler or a waste heat recovery system.

2. Description of the Related Art

Condensate generated in a steam piping system in most cases still has a considerable quantity of heat. It therefore has been a widespread practice to provide a condensate recovery system, including a pump for recovering the condensate and feeding it into a boiler or a waste heat recovery system for the purpose of effective utilization of waste heat from the condensate, thus making effective use of this energy.

The pump used in prior art condensate recovery system collects the condensate in a vessel, and then introduces a high-pressure working fluid—such as steam—into the vessel by operating a change-over valve. The pressure of the high-pressure working fluid discharges the condensate from the inside of the vessel. To insure high-efficiency operation of the pump, it is necessary to collect as much condensate as possible within the vessel and to properly switch the change-over valve.

The pump of the prior art, therefore, generally adopts a snap mechanism, provided with a coil spring in order to insure reliable switching of the change-over valve. A pump which is equipped with a built-in snap mechanism provided with a coil spring is disclosed in U.S. Pat. No. 5,141,405, to Francart.

Figure 13:
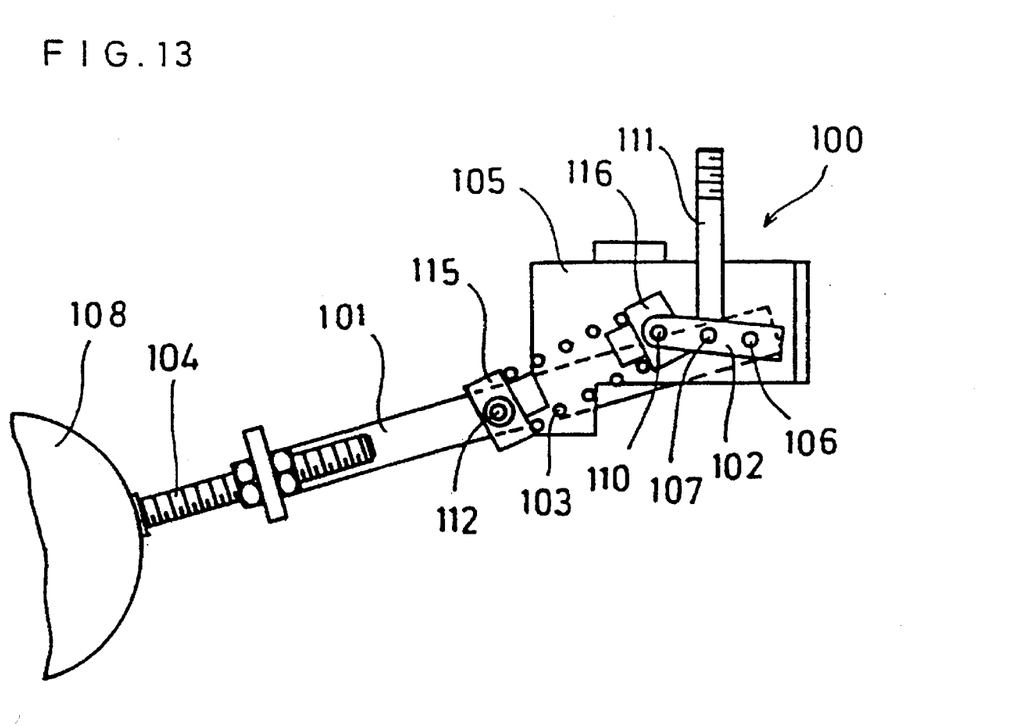
Figures 14A, 14B, 14C, 15:
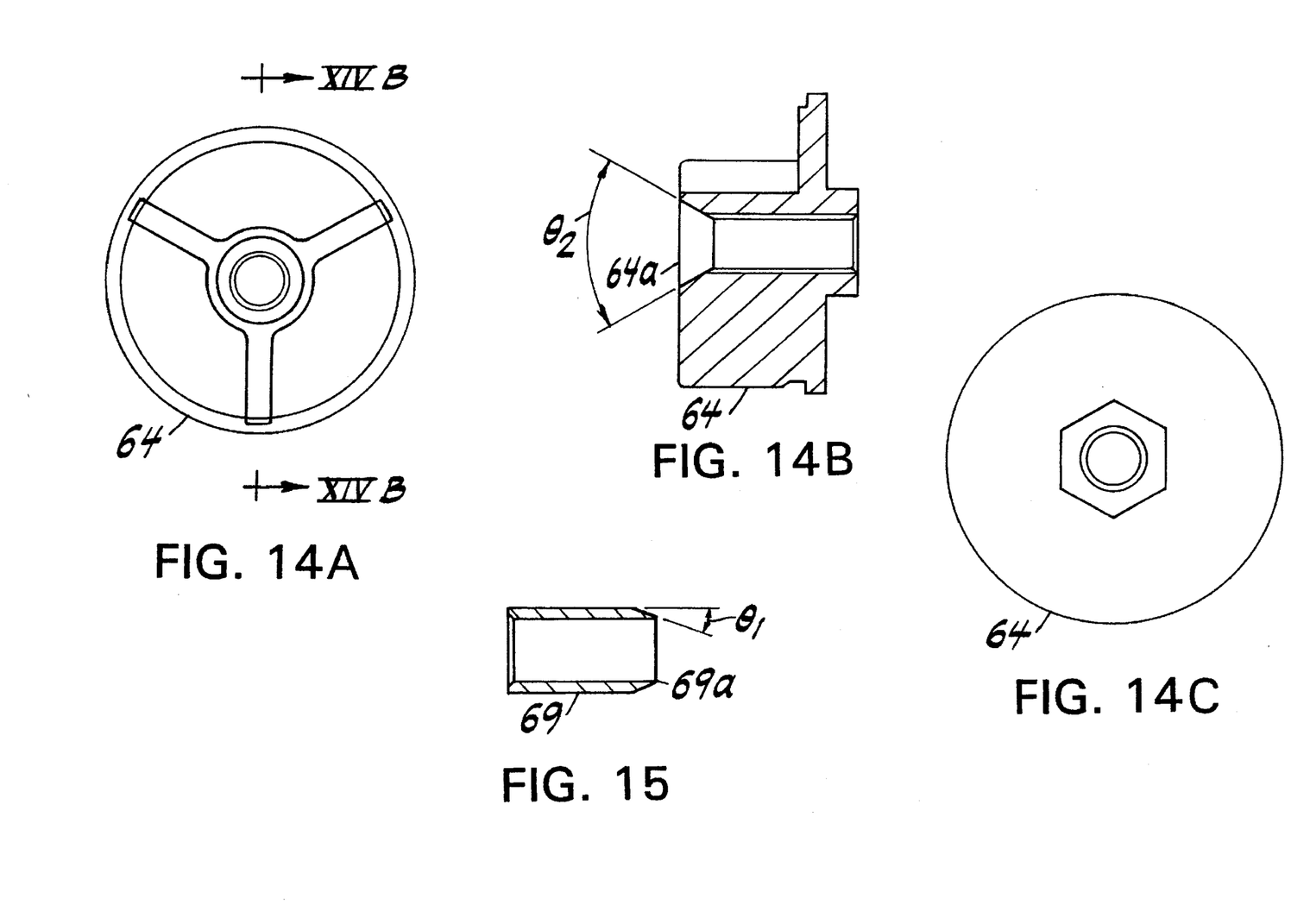
FIGS. 14A–14C show a cross-sectional side view and end views of the lower valve head of the present invention.
FIG. 15 shows a cross-sectional side view of the connecting tube of the present invention.

FIG. 13 is a front view of a snap mechanism used in the prior art pump described in the Francart patent. In the pump disclosed in the Francart patent, the snap mechanism 100 comprises a main arm 101, a first arm 102, and a coil compression spring 103. The main arm 101 is pivotally supported, by a first shaft 106, on a supporting member or frame 105. On the forward end of the main arm 101 is connected a float 108, through a screw member 104 which is fastened to the float 108.

The first arm 102 is connected at one end to the supporting member 105 by the first shaft 106, and therefore to the main arm 101, and at the other end to one end of the coil spring 103 by a third shaft 110, through a spring bracket member 116. The other end of the coil spring 103 is connected to the main arm 101 by a second shaft 112 through a spring bracket member 115. A valve spindle operating rod 111 is connected by a shaft 107 to the center part of the first arm 102. The valve spindle (not shown) and the snapping mechanism 100 are linked to the change-over valve through the valve spindle operating rod 111.

In the prior art pump, accumulation of condensate in the vessel (not shown) causes the float 108 to rise. As the float 108 rises, the spring bracket member 115 side of the coil spring 103 moves upward, thus compressing the coil spring 103. With further rise of the float 108, the coil spring 103 is in line with the first arm 102. The float 108 rises further until an angle between the coil spring 103 and the first arm 102 exceeds 180 degrees. As a result, the coil spring 103 suddenly recovers from compression, and the connecting section (the third shaft 110) between the coil spring 103 and the first arm 102 snaps downward. This movement results in downward movement of the valve spindle operating rod 111 connected to the first arm to thereby suddenly switch the change-over valve (not shown).

The prior art pump has a problem—notwithstanding its simple design and its ability to relatively efficiently pump liquid—that a great deal of buoyancy, or a large float, is needed to obtain a large force for proper switching of the change-over valve. This is because, in a triangle formed by the first shaft 106, the second shaft 112, and the third shaft 110, the distance between the first shaft 106 and the second shaft 112 is longer than that between the first shaft 106 and the third shaft 110. The distance between the first shaft 106 and the second shaft 112 is long, and accordingly the magnification of buoyancy produced by the main arm 101 and transmitted to the first arm 102 is small. Furthermore, since the distance between the first shaft 106 and the third shaft 110 is short, the magnification of buoyancy by the first arm 102 which is transmitted to the valve spindle operating rod 111 is also small.

SUMMARY OF THE INVENTION

In the view of the above-described disadvantages inherent to the prior art apparatus, it is an object of the present invention to provide a pump which is capable of actuating the change-over valve with a large force, even with a float with little buoyancy, while still performing reliably.

The present invention features a pump in which a float, a change-over valve, and a snap mechanism are built in a vessel having a working fluid inlet port, a working fluid discharge port, a liquid inlet port, and a liquid discharge port. The snap mechanism includes a first shaft pivotally supported within the vessel, a main arm rotating around the first shaft, a first toggle link rotating around the first shaft, a second shaft pivotally supported functionally on the main arm at a point spaced a small distance from the first shaft and parallel with the first shaft, a third shaft pivotally supported functionally to the first toggle link at a point spaced a large distance from the first shaft and parallel with the first shaft, and a second toggle link mounted between the second shaft and the third shaft and pivotable at both mounting positions. A connecting mechanism functionally connects the float to the main arm at a point spaced from the first shaft, and another connecting mechanism functionally connects the change-over valve to the first toggle link. A compressible-expandable mechanism, which compresses to keep the first toggle link at rest until the second shaft is aligned with the first shaft and the third shaft, extends when the second shaft has gone beyond the position of alignment with the first shaft and the third shaft, thus snapping to move the first toggle link.

In the pump of the present invention, accumulation of condensate in the vessel causes the float to rise to rotate the main arm around the first shaft, and the second shaft moves between the first shaft and the third shaft until aligning with the first shaft and the third shaft, thus compressing to deform the compressible-expandable mechanism. As the float goes further upward, the second shaft exceeds the position of alignment with the first shaft and the third shaft and the compressible-expandable mechanism suddenly extends to recover from deformation, thus snapping to move the third shaft. As a result, the change-over valve is suddenly switched, allowing liquid accumulated within the vessel to be pumped.

In the snap mechanism used in the pump of the present invention, the distance between the first shaft and the third shaft is longer than that between the first shaft and the second shaft. In a triangle formed by the first shaft, the second shaft and the third shaft, the distance between the first shaft and the second shaft is short while the distance between the first shaft and third shaft is long; the magnification of buoyancy by the main arm which is transmitted to the first toggle link is therefore large and the magnification of buoyancy by the first toggle link which is transmitted to the change-over valve is also large. Consequently, the change-over valve can operate properly with great force even when little buoyancy, i.e., a small float, is used.

The present invention also includes a valve at the liquid discharge port which acts as a trap for the vessel. The valve is connected to the float mechanism, so that the valve opens when the float rises in response to accumulation of liquid in the vessel. The valve ensures that a liquid seal is maintained at the liquid discharge port. The valve includes a double seal, to equalize fluid pressure on the valve and therefore make actuation of the valve easier. A mechanism for coupling the valve to the float is provided, as well as a mechanism for adjusting the double seal on the valve to ensure a good seal at both valve seats. The valve preferably moves downward to unseat, to thereby allow less space to be used in the interior of the vessel by the valve.

The above and other subjects, features and advantages of the present invention will become more clear from the following description with reference to the accompanying drawings.

DETAILED DESCRIPTION OF PREFERRED EMBODIMENTS

Figure 1:
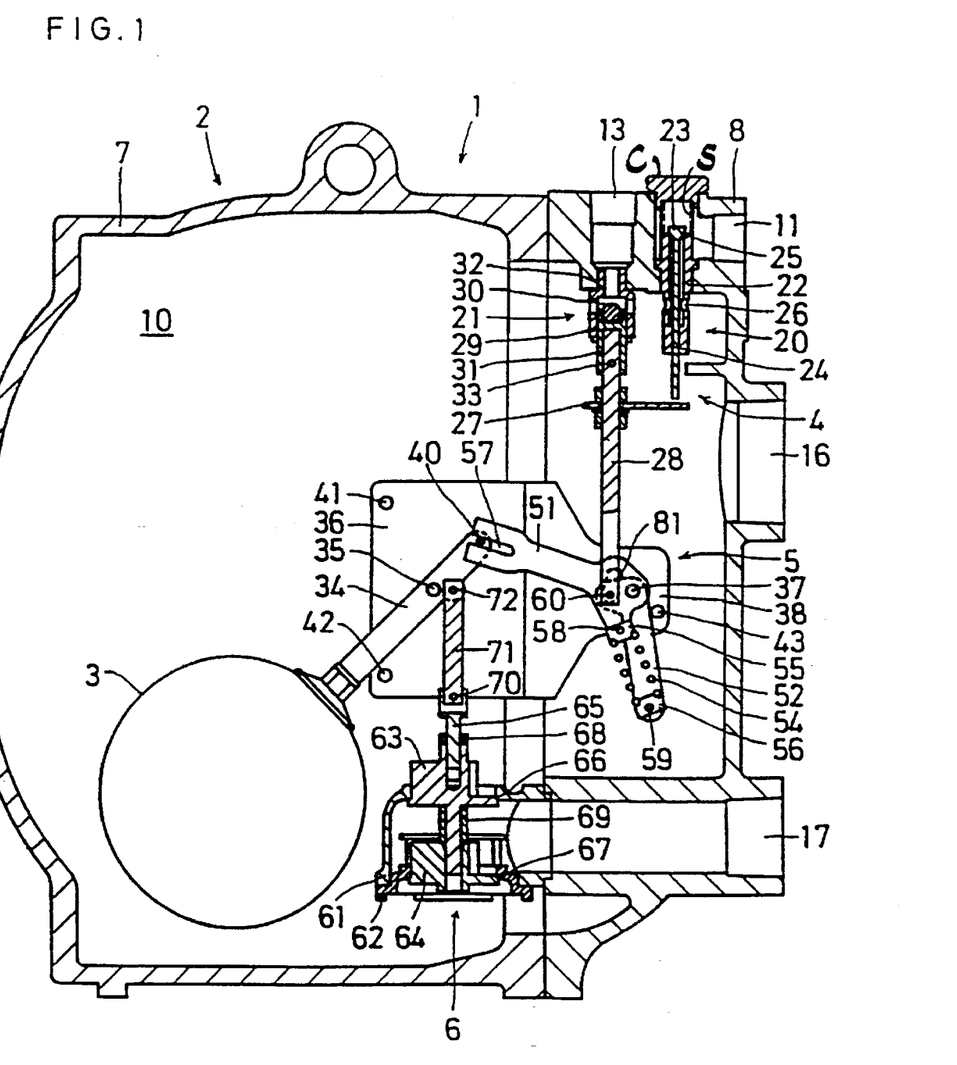
FIG. 1 is a cross-sectional view of a first embodiment of a pump according to the present invention.

FIG. 1 is a cross-sectional view of a first embodiment of the combination pump and trap of the present invention.

Figure 2:
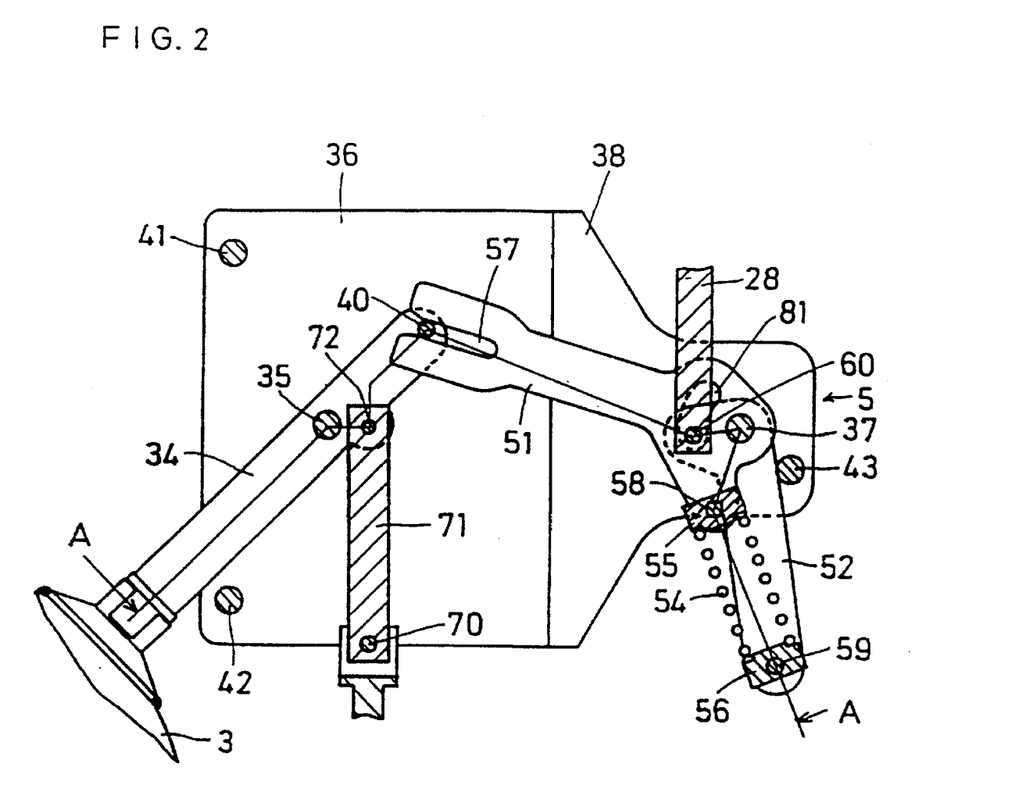
FIG. 2 is an enlarged cross-sectional view of a snap mechanism section of FIG. 1.
Figure 3:
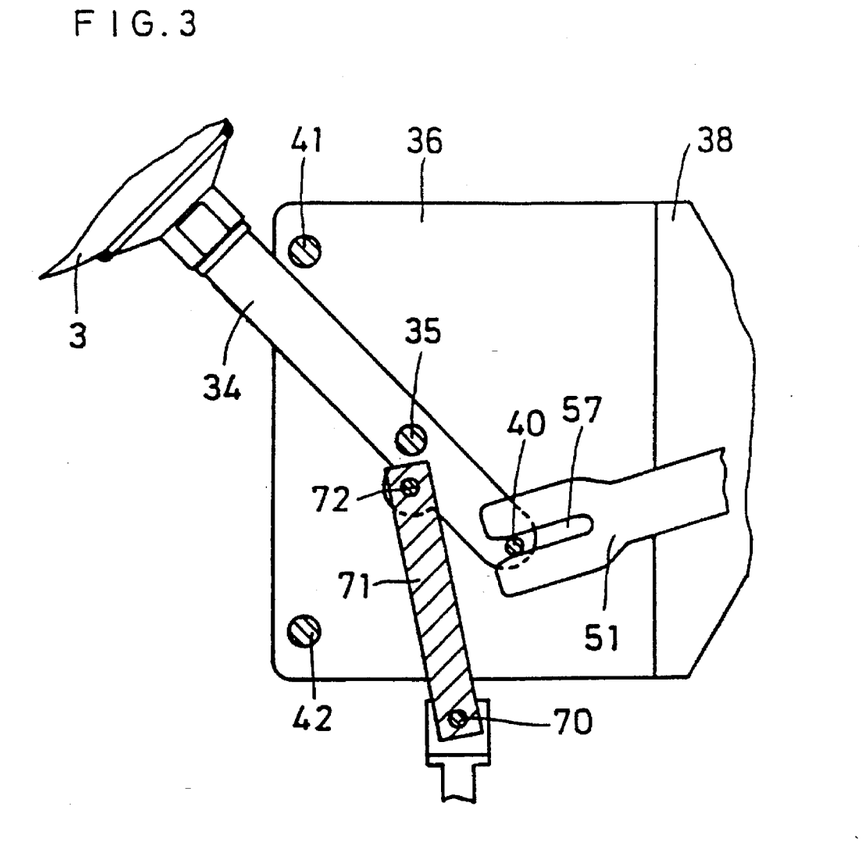
FIG. 3 is an enlarged cross-sectional view of a float arm section with the float in a raised position.
Figure 4:
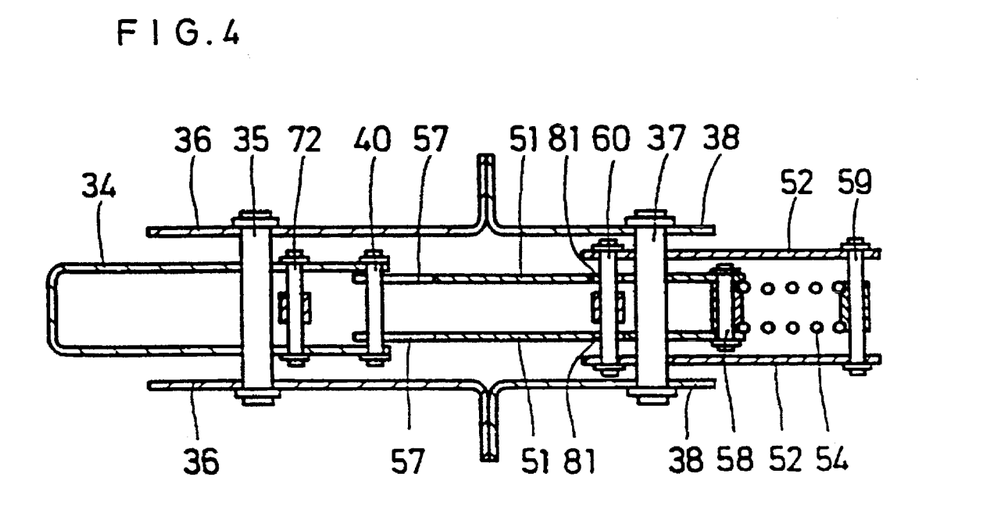
FIG. 4 is a cross-sectional view taken along line A—A of FIG. 2.

FIG. 2 is an enlarged sectional view of the snap mechanism of FIG. 1. FIG. 3 is an enlarged sectional view of the snap mechanism with the float of FIG. 1 in a raised position. FIG. 4 is a sectional view taken along line A—A of FIG. 2. In FIG. 1, the pump 1 of the embodiment of FIG. 1 includes a float 3, a change-over valve 4, a snap mechanism 5, and a valve 6, all of which are disposed within a vessel 2.

In the vessel 2 a body section 7 and a cover section 8 are connected by screws (not shown), and a liquid holding space 10 is formed inside. In the embodiment of FIG. 1, the body section 7 of the vessel 2 has no components mounted thereon; distinctive components of the embodiment are mounted on the cover section 8 of the vessel 2. The cover section 8 is provided with four openings: a working fluid inlet port 11, a working fluid outlet port 13, a liquid inlet port 16, and a liquid discharge port 17.

Inside the working fluid inlet port 11, a working fluid feed valve 20 is mounted, and inside of the working fluid outlet port 13, a working fluid exhaust valve 21 is mounted. The working fluid feed valve 20 is composed of a valve case 22, a valve head 23, and a valve lifting rod 24. The valve case 22 has a through hole provided in an axial direction; the upper end of the through hole functions as a valve seat 25. In the intermediate part of the valve case 22 four openings 26, connecting the through hole with the liquid holding space 10, are provided. The valve head 23 is of a semi-spherical or spherical form and is integrally installed at the tip of the valve lifting rod 24.

The working fluid feed valve 20 is particularly adapted to easy cleaning without disassembly of the vessel 2. A sealing cap C is removably mounted, preferably by screw threads, on cover section 8 above valve head 23, thereby allowing access to the working fluid feed valve 20 interior. A screen S may surround the valve head 23 to trap particles to prevent the particles from clogging the working fluid feed valve 20. The valve head 23 and valve lifting rod 24, integrally formed together, can be removed as a unit through the hole through cover section 8 into which the sealing cap is mounted. This ability is in part due to the absence of a fixed connection between valve lifting rod 24 and connecting plate 27. This lack of a fixed connection also allows the working fluid feed valve 20 to be manufactured without the need for tight tolerancing between the valve lifting rod 24 and the valve spindle operating rod 28. The valve case 22 can thereafter be removed from the cover section 8 through the same hole. Accordingly, each of the elements of working fluid feed valve 20 may be removed and cleaned externally of the vessel 2, without the need to separate cover section 8 and body section 7.

In the pump 1 of the present invention, the tip of the valve case 22 of the working fluid feed valve 20 is screwed into the working fluid inlet port 11. The valve head 23 is located on the working fluid inlet port 11 side, and the valve lifting rod 24 is inserted through the through hole in the valve case 22 to the vessel 2 side into contact with a connecting plate 27. The connecting plate 27 is connected to valve spindle operating rod 28. The valve spindle operating rod 28 is connected to the snap mechanism 5.

The working fluid exhaust valve 21 is composed of a valve case 29, a valve head 30, and a valve lifting rod 31. The valve case 29 has a through hole in an axial direction, in which a valve seat 32 is provided. The valve head 30 secured on the tip of the valve lifting rod 31 comes from below into contact with the valve seat 32, thus opening and closing the valve. The valve spindle operating rod 28 and the valve lifting rod 31 are connected by a pin 33. The change-over valve 4 includes the working fluid feed valve 20 and the working fluid exhaust valve 21; when the working fluid feed valve 20 is opened, the working fluid valve 21 is closed, and when the working fluid feed valve 20 is closed, the working fluid exhaust valve 21 is opened. Any pressurized fluid may be used as the working fluid to power pump 1.

The liquid inlet port 16 is located nearly at the center of the cover section 8 and the liquid discharge port 17 is in a position corresponding to the lower part of the vessel 2. The float 3 is supported by a bracket 36 through a float arm 34 and a shaft 35. The snap mechanism 5 is supported on a bracket 38 through a first shaft 37. The bracket 36 and the bracket 38 are connected by screws (not shown), and are integrally attached to the cover section 8 of the vessel 2. The float arm 34 is produced from a plate bent into a U shape, so that two parallel plates will face each other as shown in FIG. 4. The float 3 is connected to the bent section of the float arm 34; to the other end of the float arm 34 is connected a shaft 40.

The bracket 36 as viewed from above is composed of two L-shaped plates as shown in FIG. 4, with shafts 41 and 42 and the aforementioned shaft 35 connected across the plates. The shaft 35 also serves as a pivot; the float 3 moves up and down around the shaft 35. The shafts 41 and 42 also serve as upper and lower limit stops, respectively, for the float 3. On the side, the bracket 38 consists of two L-shaped plates, across which the shaft 43 and the first shaft 37 are mounted for connecting these two plates. The shaft 43 also functions as a stopper for a first arm 52, described below.

The snap mechanism 5 includes a main arm 51, a first arm 52, a coil compression spring 54, a spring bracket member 55, and a spring bracket member 56. The main arm 51 consists of two plates parallel with each other as shown in FIG. 4. On the left-hand end (in FIG. 1) of the two plates a slot 57 is provided. The main arm 51 is pivotally supported by the first shaft 37 at the angled section of main arm 51 thereby forming a first pivot connection. In the slot 57 of the main arm 51 is fitted the shaft 40 of the float arm 34. Because of this connection, the main arm 51 follows up and down motions of the float 3, rocking up and down on the first shaft 37.

The left end (in FIG. 1) of the main arm 51 swings downward as the float 3 rises on an opposite end of main arm 51 is mounted a second shaft 58 parallel with the first shaft 37. The spring bracket member 55 is pivotally supported by the second shaft 58 thereby forming a second pivot connection. The first arm 52 is pivotally supported on the first shaft 37. The first arm 52 consists of two parallel plates facing each other as shown in FIG. 4, each of which is of an inverted L shape. The lower end of the first arm 52 has mounted on it the third shaft 59, parallel with the first and second shafts 37 and 58, and the spring bracket member 56 is pivotally supported on the third shaft 59 thereby forming a third pivot connection. Between the spring bracket members 55 and 56 is mounted the coil compression spring 54. The distance between the first shaft 37 and the third shaft 59 is longer than the distance between the first shaft 37 and the second shaft 58. On the upper end of the first arm 52 a shaft 60 is mounted, to which the lower end of the valve spindle operating rod 28 is connected. The main arm 51 has a window 81, which is open so as not to interfere with the operation of the shaft 60.

On the liquid holding space 10 side of the liquid discharge port 17 is provided a valve 6 which is a double valve. The valve 6 is composed of upper and lower valve cases 61 and 62, upper and lower valve heads 63 and 64, and a drain valve shaft 71. The upper valve case 61 and the lower valve case 62 are fastened together by screws or bolts (not shown) the upper valve case 61 is secured to the cover section 8 by screws or bolts (not shown). In the upper valve case 61 is formed an upper valve seat 66, while in the lower valve case 62 is formed a lower valve seat 67. The valve seats 66, 67 are in direct communication with the liquid holding space 10 such that liquid from the liquid holding space 10 flows out the fluid discharge port directly from the liquid holding space 10 directly through the openings surrounded by valve seats 66, 67. The upper valve head 63 is connected by screw threads to a link 65, which link 65 is locked from rotating by a nut 68. On the lower shaft portion of the upper valve head 63 the lower valve head 64 is threadedly connected. A connecting tube 69 is provided between the upper valve head 63 and the lower valve head 64 to space the upper valve head 63 and the lower valve head 64 from one another at a specific distance, to thereby ensure accurate seating of both valve heads 63, 64 on the corresponding valve seats 66, 67 without the need for close tolerancing of the valve heads 63, 64.

As shown in FIGS. 14A–C and 15, the connecting tube 69 has an outer circumferential lower end 69a formed with a narrowed cone shape defined by an angle $\theta_1$. This lower end 69a mates with a recess 64a in the upper end of the lower valve head 64, which recess 64a is formed as a conical hole defined by an angle $\theta_2$. As the lower valve head 64 is threaded onto the lower shaft portion of the upper valve head 63, the conical surface of the recess 64a in the lower valve head 64 is forced against the lower end 69a of the connecting tube 69 so as to deform the lower end 69a inwardly. This arrangement between the connecting tube 69 and lower valve head 64 creates a seal between the members, thereby preventing leakage through the valve 6.

The upper end of the link 65 is pivotally connected to the drain valve shaft 71, and furthermore the upper end of the drain valve shaft 71 is pivotally connected by a shaft 72 to the float arm 34. The shaft 72 is located slightly oblique and downward of the shaft 35 when the float 3 is in the lowermost position as shown in FIG. 2, and is almost immediately below the shaft 35 when the float 3 comes to the topmost position as shown in FIG. 3. The upper and lower valve heads 63 and 64 move downwards with the rise of the float 3, communicating the liquid holding space 10 with the liquid discharge port 17, and move upwards with downward movement of the float 3, thus closing the liquid discharge port 17.

Next, operation of the present embodiment of the pump 1 will be explained according to a series of operational procedures in which steam is used as a working fluid. First, the external piping of the pump 1 is connected, on the working fluid inlet port 11 side, to high-pressure steam source, and, on the working fluid discharge port 13 side, to the steam circulation piping. The liquid inlet port 16 is connected to a load, such as a steam-using apparatus, via a check valve (not shown) which opens towards the liquid holding space 10. The liquid discharge port 17 is connected to equipment to which liquid is pumped—such as a boiler—via a check valve (not shown) which opens away from the liquid holding space 10.

When no condensate is present in the liquid holding space 10 of the combination pump and trap of the present invention, the float 3 is in the bottom position as shown in FIG. 1. At this time, the working fluid feed valve 20 in the change-over valve 4 is closed, while the exhaust valve is open. The valve 6 is in a closed position, thereby preventing liquid from exiting through liquid discharge port 17. When condensate is produced in the load, such as a steam-using apparatus, the condensate flows down through the liquid inlet port 16 to the pump 1, accumulating in the liquid holding space 10.

As the float 3 rises with the accumulation of the condensate in the liquid holding space 10, the float arm 34 rotates clockwise on the center of the shaft 35, the shaft 72 connected to the drain valve shaft 71 moves downwards, and the upper and lower valve heads 63 and 64 move downwards, through movement of the drain valve shaft 71 and the link 65, thus opening the valve 6. This allows communication between the liquid holding space 10 and the liquid discharge port 17. The float 3 position and buoyancy is selected so that the valve 6 does not open until the liquid level in the liquid holding space 10 is above the level of the upper valve head 63, thereby, ensuring a liquid seal at valve 6. Furthermore, the configuration of the float arm 34 and the drain valve shaft 71 are such that the initial rise of float 3 will cause rapid opening of the valve 6, and, vice versa, the valve 6 will rapid close only as the float approaches its bottommost position.

On the snap mechanism 5, the main arm 51 rotates counterclockwise on the center of the first shaft 37 through interlock with the downward movement of the shaft 40, driven by rotation of the float arm 34, and the second shaft 58 moves to the right to align with the first shaft 37 and the third shaft 59, compressing the coil spring 54. Then, with further rise of the float 3, the second shaft 58 moves to the right past the position of alignment with the first shaft 37 and the third shaft 59, the coil spring 54 extends suddenly to recover from a compressed state, thus allowing the clockwise rotation of the first arm 52 around shaft 37 to snap the third shaft 59 to the left. As a result, valve spindle operating rod 28 connected to the shaft 60 of the first arm 52 moves upwards, to thereby open the working fluid feed valve 20 and to close the working fluid exhaust valve 21.

With the opening of the working fluid inlet port 11, high-pressure steam is led into the vessel 2. Vessel pressure increases on the condensate in the liquid holding space 10, thereby forcing the condensate, with steam pressure, out the liquid discharge port 17 to an exterior boiler or waste heat recovery system via a check valve (not shown).

With discharge of the condensate, the water level in the condensate holding space 10 goes down, to lower the float 3. The float arm 34 rotates in the counterclockwise direction on the center of the shaft 35, thereby moving upwards the shaft 72 which is connected to the drain valve shaft 71. Upward movement of drain valve shaft 71 moves the upper and lower valve heads 63 and 64 upwards via the link 65, thus closing the valve 6. In the process of operation of the valve 6 from the full-open position to the full-close position, the shaft 72 moves from a position nearly directly below the shaft 35 as shown in FIG. 3 to a position obliquely a little below the shaft 35 as shown in FIG. 2, and therefore the more the valve 6 approaches the full-close position, the more it displaces towards closing the valve. In other words, when the float 3 goes downwards from the level shown in FIG. 2, the valve 6 is held close to the full-open position during the initial period of downward movement, thus allowing quick discharge of, the condensate.

On the snap mechanism 5 side, the main arm 51 rotates clockwise on the first shaft 37, in interlock with the upward movement of the shaft 40, driven by the rotation of the float arm 34. The second shaft 58 moves to the left into alignment with the first shaft 37 and the third shaft 59, compressing the coil spring 54. With further downward movement of the float 3, the second shaft 58 moves to the left past the position of alignment with the first shaft 37 and the third shaft 59, and then the coil spring 54 suddenly extends to recover from compression, driving the first arm 52 to turn in the counterclockwise direction to snap the valve spindle operating rod 28, connected to the shaft 60 of the first arm 52, downwards. Thus the working fluid feed valve 20 is closed, while the working fluid exhaust valve 21 is opened.

Figure 5:
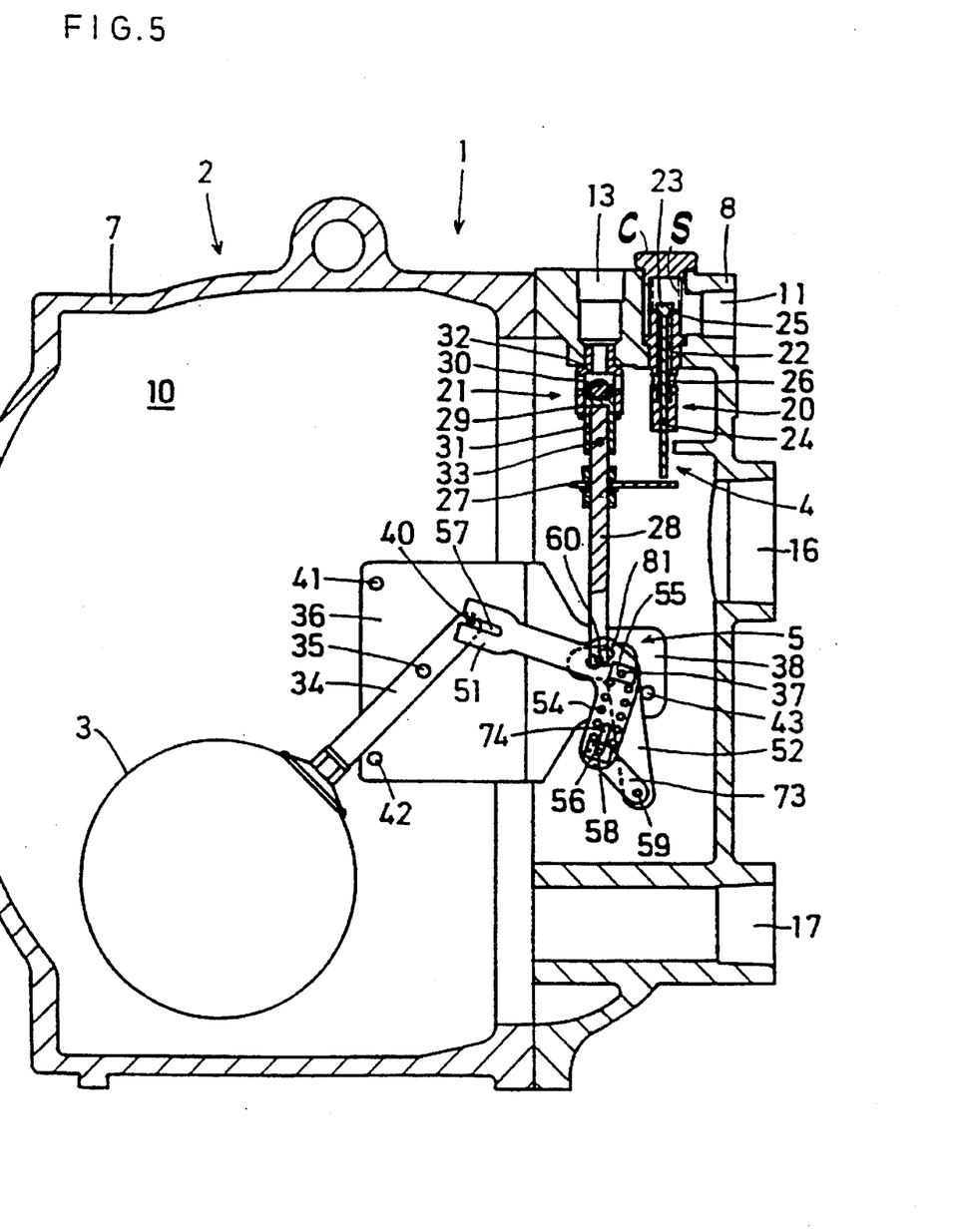
FIG. 5 is a cross-sectional view of a second embodiment according to the present invention.

In the above-described embodiment, the coil spring 54 is disposed between the second shaft 58 on the main arm 51 and the third shaft 59 on the first arm 52. Next, a configuration in which the coil spring 54 is disposed between the first shaft 37 on the main arm 51 and the second shaft 58 on the main arm 51, which is apart from the first shaft 37, will be explained with reference to FIG. 5. In the embodiment to be described below, members operating similarly to those explained in the above-described embodiment are designated by similar numerals in order to prevent redundancy. FIG. 5 is a sectional view of another embodiment of the pump of the present invention.

The snap mechanism 5 includes the main arm 51, the first arm 52, a second arm 73, the coil compression spring 54, the spring bracket member 55, and the spring bracket member 56. The main arm 51 is composed of two parallel plates, each of which is L-shaped when viewed from the front. The angled section of the main arm 51 is pivotally supported by the first shaft 37. On the lower end of the main arm 51, the second shaft 58 is mounted, parallel with the first shaft 37. The second shaft 58 is movable only in the direction of the first shaft 37 along a long hole or slot 74 formed in the main arm 51. The coil compression spring 54 is mounted between the spring bracket member 55, supported on the first shaft 37, and the spring bracket member 56, supported on the second shaft 58.

The first arm 52 is pivotally supported on the first shaft 37 at the angled section of first arm 52. On the lower end of the first arm 52 the third shaft 59 mounted in parallel with the first and second shafts 37 and 58. Between the third shaft 59 and the second shaft 58 the second arm 73 is mounted. The second arm 73 is composed of two parallel plates which are rotatable on the second and third shafts 58 and 59. The distance between the first shaft 37 and the third shaft 59 longer than the distance between the first shaft 37 and the second shaft 58.

In the present invention, it should be noted that the second shaft 58, operating with rotation of the main arm 51, is aligned with the first shaft 37 and the third shaft 59 while moving towards the first shaft 37 along the long hole 74, to thereby compress the coil spring 54. The coil spring 54, therefore, is axially compressed to deform in the direction of the first shaft, only in the direction of extension and contraction. The coil spring 54 does not curve, and constantly maintains a straight-line state to thereby prevent damage of the coil spring as a result of bending of the coil spring 54.

Figure 6:
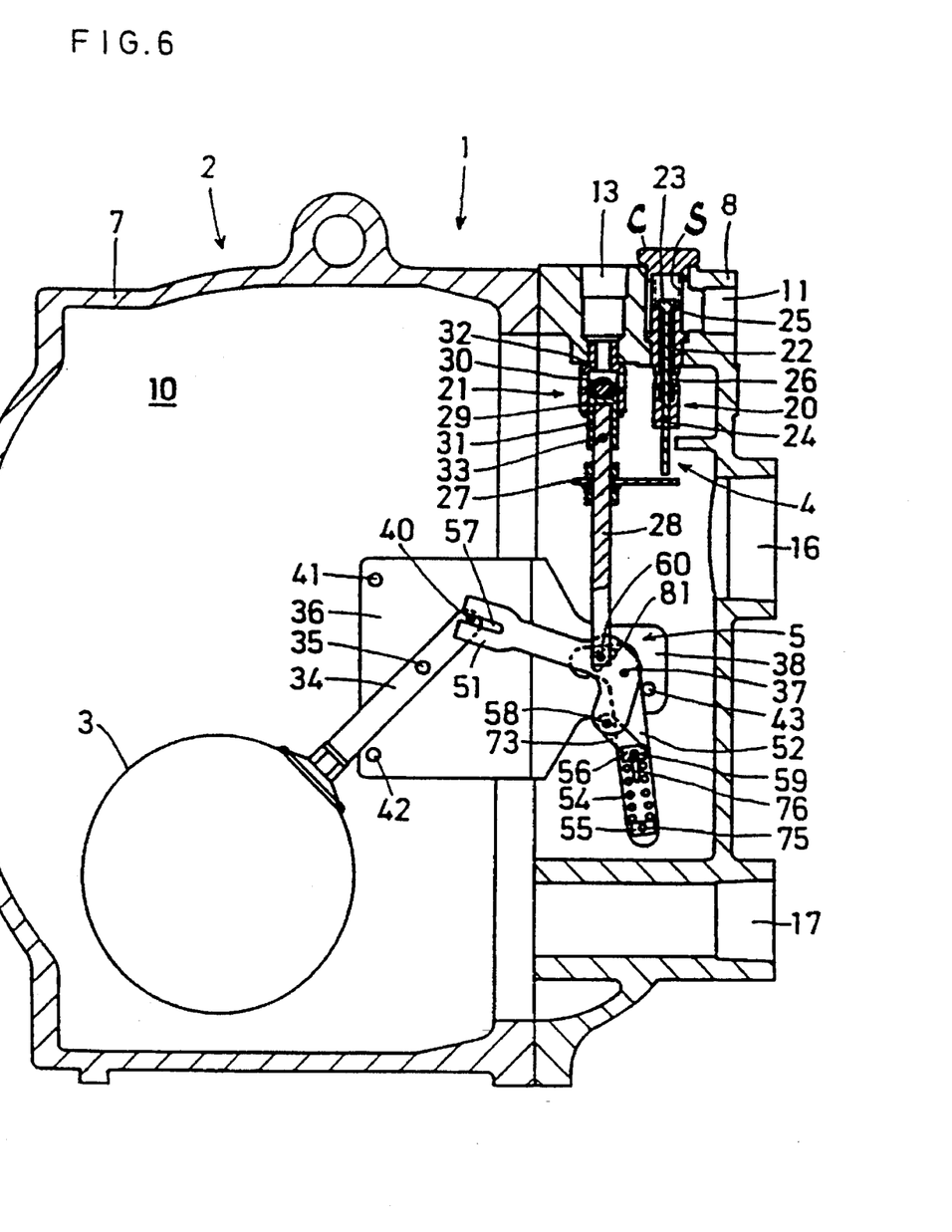
FIG. 6 is a cross-sectional view of a third embodiment according to the present invention.

Next, an explanation will be given by referring to FIG. 6 of a coil spring 54 disposed between the third shaft 59 on the first arm 52 and a fourth shaft 75 on the first arm 52, apart from the third shaft 59. FIG. 6 is a sectional view of another embodiment of the pump of the present invention.

The snap mechanism 5 includes the main arm 51, the first arm 52, the second arm 73, the coil compression spring 54, the spring bracket member 55, and the spring bracket member 56. The angled section of the main arm 51 is pivotally supported by the shaft 37. At the lower end of the main arm 51 is installed the second shaft 58 parallel with the first shaft 37.

The first arm 52 is pivotally supported to the first shaft 37 at the angled section of the first arm 52. At the intermediate part of the first arm 52 is installed the third shaft 59 parallel with the first and second shafts 37 and 58. At the lower end of the first arm 52 is installed the fourth shaft 75 parallel with the first, second and to third shafts 37, 58 and 59. The third shaft 59 is movable only in the direction of the fourth shaft 75 along the long hole 76 formed in the first arm 52. Between the third shaft 59 and the second shaft 58, the second arm 73 is pivotally installed. Between the spring bracket member 55 supported on the fourth shaft 75 and the spring bracket member 56 supported on the third shaft 59 is mounted the coil compression spring 54. The distance between the first shaft 37 and the third shaft 59 is longer than that between the first shaft 37 and the second shaft 58.

In the present embodiment, it should be noted that the third shaft 59 moves in the direction of the fourth shaft 75 along the long hole 76 to deform by compression the coil spring 54 when the second shaft 58, operating in interlock with the rotation of the main arm 51, comes in line with the first shaft 37 and the third shaft 59. The coil spring 54, therefore, is deformed only in the direction of the fourth shaft 75, that is, in the direction of extension and contraction similar to the embodiment shown in FIG. 5. This movement ensures that the coil spring 54 is not subject to damage or breakage as the result of bending.

Figure 7:
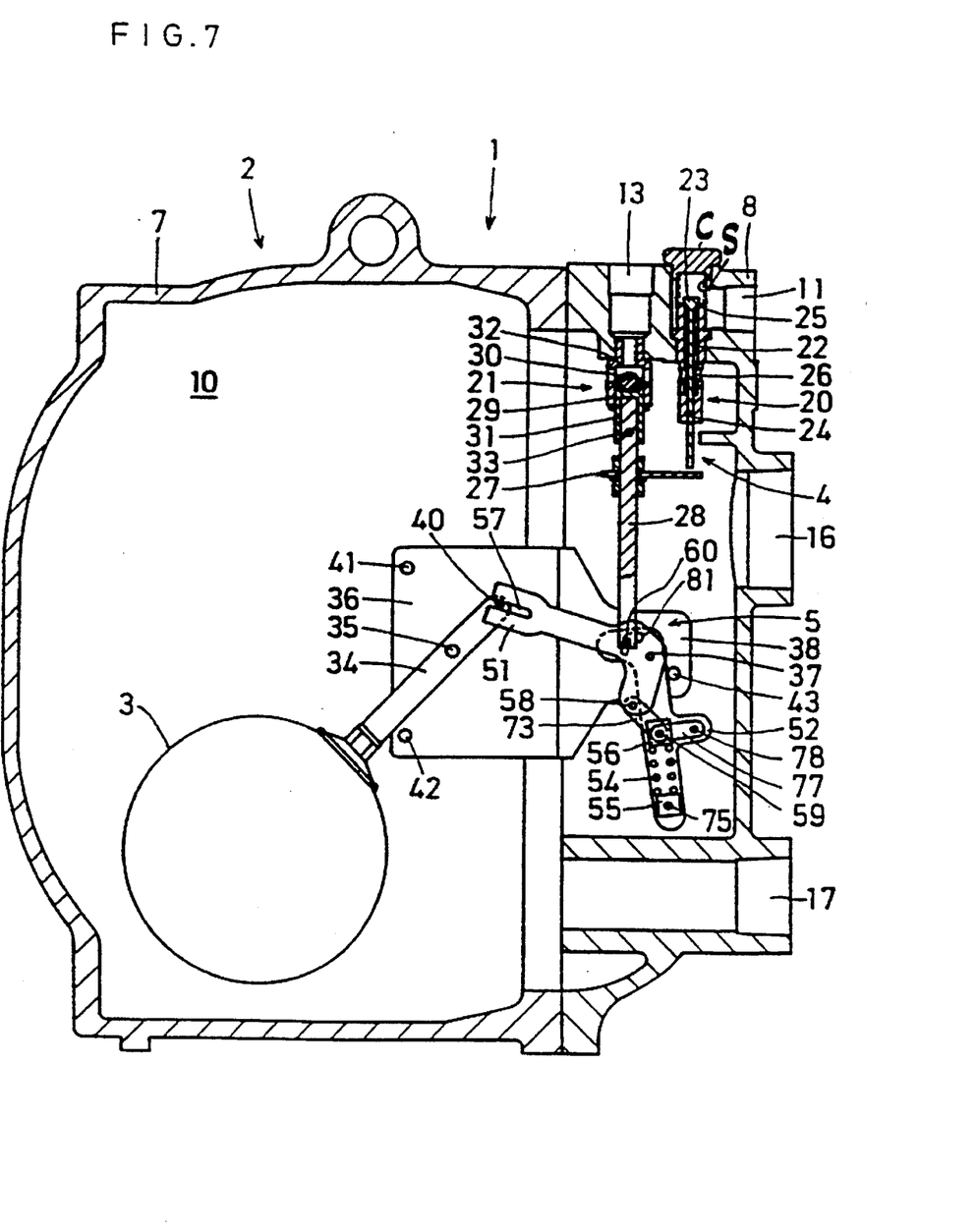
FIG. 7 is a cross-sectional view of a fourth embodiment according to the present invention.

Next, a embodiment with the coil spring 54 disposed between the third shaft 59, functionally connected on the first arm 52 by a crank arm 77, and a fourth shaft 75 on the first arm 52, apart from the third shaft 59, will be explained by referring to FIG. 7. FIG. 7 is a sectional view of a further pump of the present invention.

The snap mechanism 5 is composed of the main arm 51, the first arm 52, the second arm 73, the crank arm 77, the coil compression spring 54, the spring bracket member 55 and the spring bracket member 56. The angled section of the main arm 51 is pivotally supported by the first shaft 37. On the lower end of the main arm 51 is installed the second shaft 58 parallel with the first shaft 37. The upper end of the second arm 73 is pivotally supported on the second shaft 58. The third shaft 59 is installed on the lower end of the second arm 73, which third shaft 59 is parallel with the first and second shafts 37 and 58.

The first arm 52 is pivotally supported on the first shaft 37 at the angled section of the first arm 52. On the lower end of the first arm 52 the fourth shaft 75 is installed parallel with the first second and third shafts 37, 58 and 59. The coil compression spring 54 is mounted between the spring bracket member 55, pivotally supported on the fourth shaft 75, and the spring bracket member 56, pivotally supported on the third shaft 59. On the portion projecting to the right from the intermediate section of the first arm 52, a fifth shaft 78 parallel with the first through to fourth shafts 37, 53, 59 and 75 is installed. Between the fifth shaft 78 and the third shaft 59 is mounted the crank arm 77. The crank arm 77 consists of two parallel plates facing each other, and are rotatable at the points where the third and fifth shafts 59 and 78 are connected. The distance between the first shaft 37 and the third shaft 59 is longer than that between the first shaft 37 and the second shaft 58.

In the present embodiment, it should be noted that the third shaft 59 moves in the direction of the fourth shaft 75 while rotating about the fifth shaft 78. When the second shaft 58 comes in line with the first shaft 37 and the third shaft 59, by rotation of the main arm 51, the coil spring 54 is compressed. The coil spring 54, supported by the crank arm 77 when snapping over, is not subject to lateral bending or vibration and accordingly is prevented from being damaged.

Figure 8:
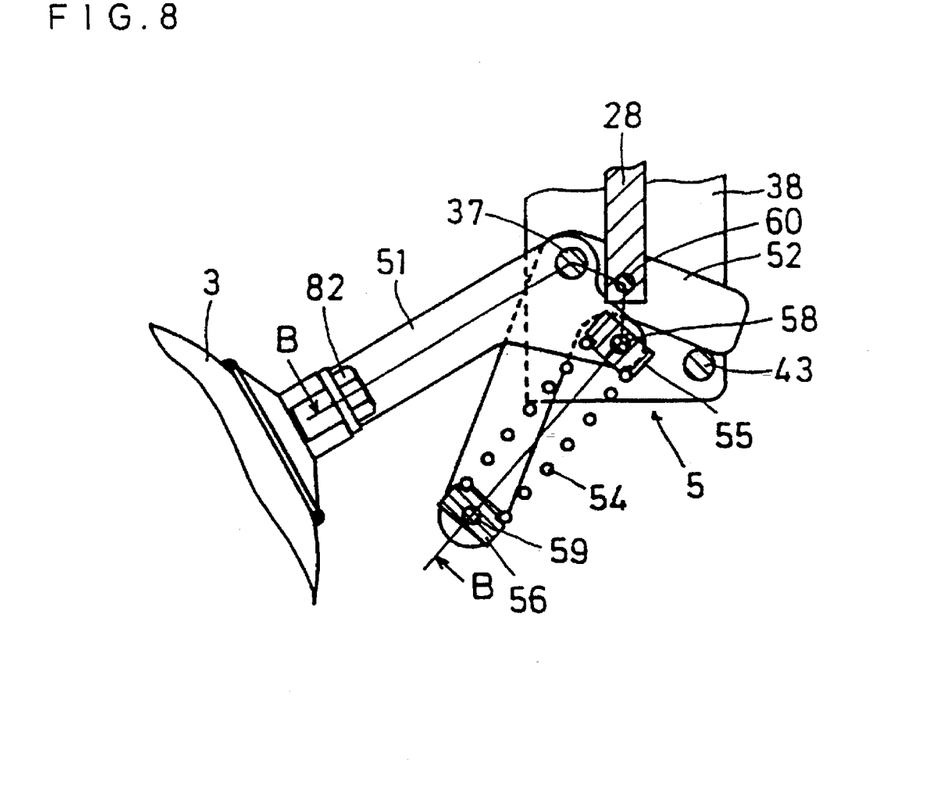
FIG. 8 is a cross-sectional view of another snap mechanism section according to the present invention.
Figure 9:
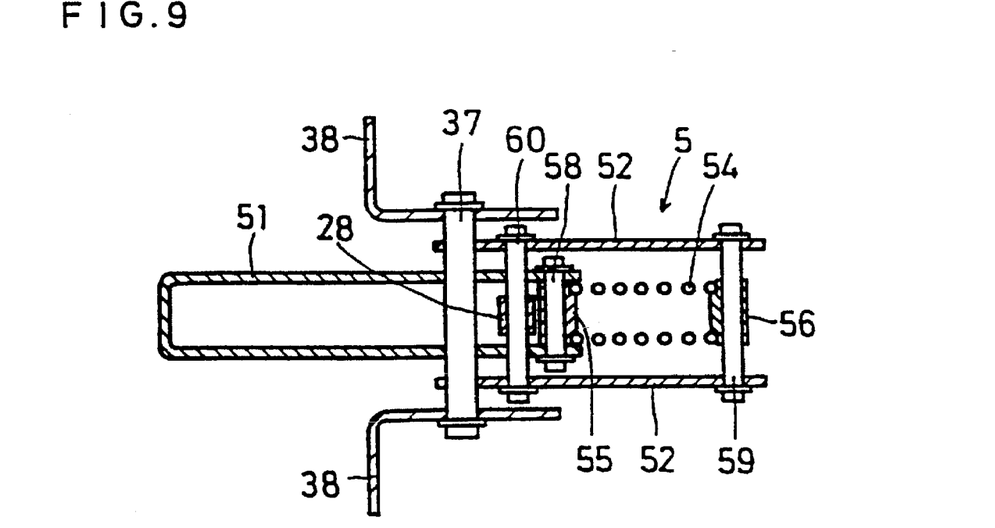
FIG. 9 is a cross-sectional view taken along line B—B of FIG. 8.

In the above-described embodiment, the float 3 is connected to the main arm 51 through the float arm 34. Next, a construction in which the float 3 is directly connected to the main arm 51 will be explained by referring to FIGS. 8 and 9. FIG. 8 is a sectional view of another snap mechanism section to be employed in the present embodiment, and FIG. 9 is a sectional view taken along line B—B.

In the snap mechanism 5 of FIG. 8 the main arm 51 is supported on the bracket 38 through the first shaft 37. The bracket 38 is integrally mounted on the vessel. The bracket 38 consists of two L-shaped plates as shown in FIG. 9 when viewed from above, the two plates being connected by the shaft 43 and the first shaft 37. The shaft 43 serves also as a stopper for the first arm 52.

The snap mechanism 5 is composed of the main arm 51, the first arm 52, the coil compression spring 54, the spring bracket member 55, and the spring bracket member 56. The main arm 51 is formed by bending a plate into a U shape as shown in FIG. 9, that is, into two parallel plates facing each other. In the bent portion of the main arm 51 the float 3 is fastened by a bolt 82. The float 3 rocks up and down on the center of the first shaft 37.

The right end (in FIG. 8) of the main arm 51 swings down to the right; on the right end is installed the second shaft 58 which is parallel with the first shaft 37. The spring bracket member 55 is pivotally supported on the second shaft 58. Also, the first arm 52 is pivotally supported on the first shaft 37 at the angled section of the first arm 52. The first arm 52 consists of two parallel plates as shown in FIG. 9, each of which is of an inverted L shape. On the lower end of the first arm 52 is installed the third shaft 59 which is parallel with the first and second shafts 37 and 58, and the spring bracket member 56 is pivotally supported on the third shaft 59. Between the spring bracket members 55 and 56 is mounted the coil compression spring 54. Furthermore, on the upper medium part of the first arm 52 is installed the shaft 60, to which the lower end of the valve spindle operating rod 28 is connected.

The operation of the snap mechanism 5 of the present embodiment differs from the above-described embodiment only in the direction of rotation of the main arm 51 and the first arm 52 which are operated by the upward and downward movement of the float 3, and therefore a detailed operation procedure will not be described.

Figure 10:
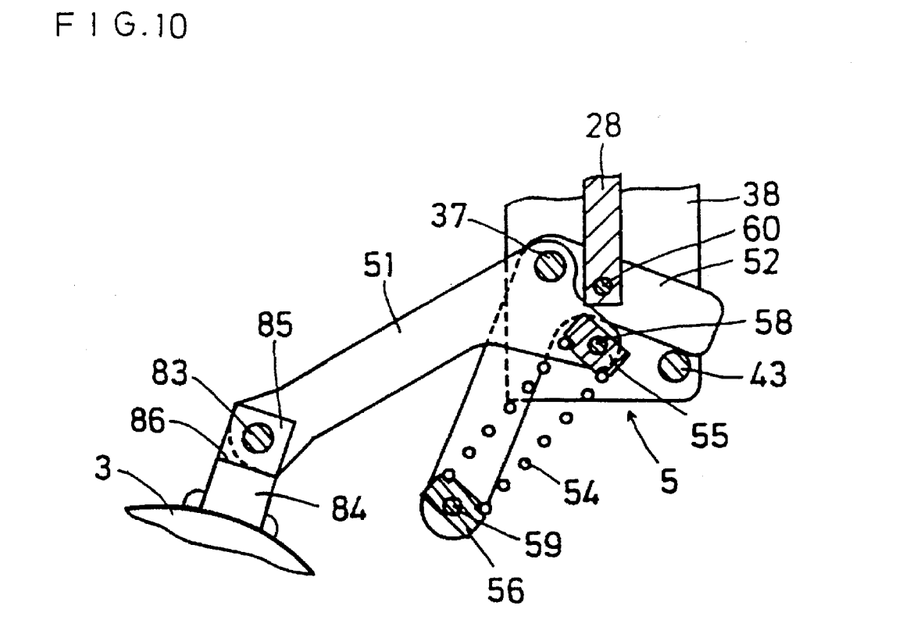
FIG. 10 is a cross-sectional view of another snap mechanism section according to the present invention.
Figure 11:
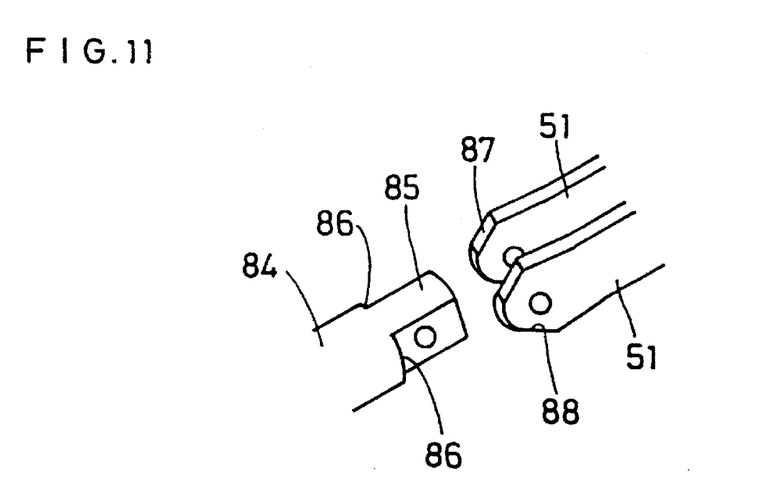
FIG. 11 is an exploded perspective view of a main arm and a connecting member in FIG. 10.

In the embodiment shown in FIGS. 8 and 9, the float 3 is fastened by a bolt 82 to the main arm 51. Next, a way in which the float 3 and the main arm 51 are loosely connected will be explained with reference to FIGS. 10 and 11. FIG. 10 is a sectional view of another snap mechanism section to be adopted in the pump according to the present invention; FIG. 11 is an exploded perspective view of a member connected to the main arm of FIG. 10.

The snap mechanism 5 includes the main arm 51, the first arm 52, the coil compression spring 54, the spring bracket member 55, and the spring bracket member 56. The main arm 51 is composed of two parallel plates facing each other. On the left end (in FIG. 10) of the two plates in installed a shaft 83, to which a connecting member 84, fixedly attached to the float 3 by welding, is pivotally installed. The connecting member 84 is a round rod having at the forward end a rectangular projection 85 formed by cutting off both sides of the rod end. The projection 85 is inserted and pivotally connected by the shaft 83 between the two plates of the main arm 51. The forward end face 86 of the shoulder of the connecting member 84 contacts the upper and lower faces 87 and 88 on the mating end side of the main arm 51, serving as a stopper to prevent further rotation over a specific position. Thus, the float 3 rocks up and down on the center of the shaft 83 which is supported by the main arm 51, according to a change in the liquid level in the vessel. The main arm 51 also rocks up and down on the center of the first shaft 37 with the up-and-down motion of the float 3 after the float 3 has moved a specific amount so that the forward end face 86 of the shoulder section of the connecting member 84 contacts the upper face 87 or the lower face 88 of the main arm 51.

In the embodiment described above, after movement by a specific amount of the float 3 so that the face 86 contacts one of the faces 87, 88, the main arm 51 rotates upon further rise or fall of the float 3. Therefore, the change-over valve can be operated in the two specific upper and lower positions without extending the connecting section between the main arm 51 and the float 3.

Figure 12:
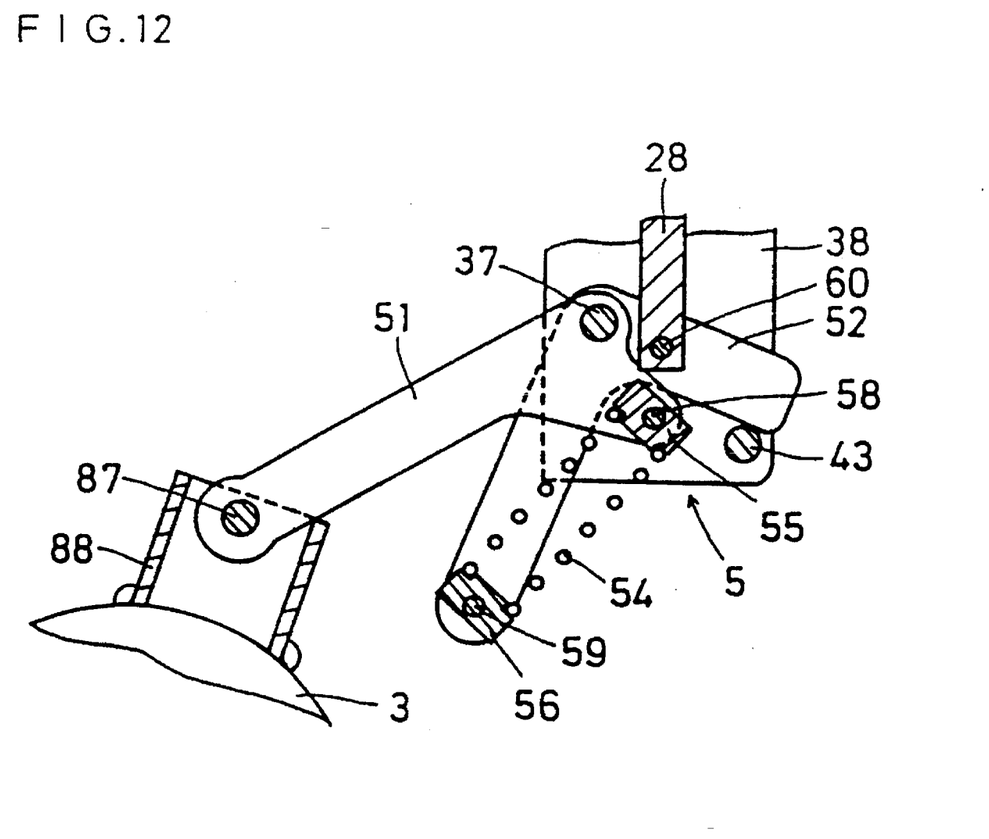
FIG. 12 is a cross-sectional view of another snap mechanism according to the present invention; and FIG.. 13 is a cross-sectional view of a snap mechanism section in a prior art pump.

Another construction in which the float 3 and the main arm 51 are loosely connected will be explained with reference to FIG. 12. FIG. 12 is a sectional view of another snap mechanism section to be adopted in the pump according to the present invention.

The main arm 51 includes two parallel plates facing each other inserted at the left end part (in FIG. 12) in a short pipe 88 securely attached to the float 3 by welding. The main arm 51 and the short pipe 88 are pivotally connected by a shaft 87, and accordingly the float 3 rocks up and down on the center of the shaft 87, supported on the main arm 51, according to a change in the liquid level in the vessel. The main arm 51 rocks up and down on the center of the first shaft 37 after the float 3 has moved a specific amount until the forward end of the short pipe 88 contacts the main arm 51.

The embodiments of FIGS. 10-12 are advantageous in that they allow a greater range of movement for the float 3 within the vessel, thereby allowing more complete filling, and more complete draining, of the vessel than a similarly constructed apparatus with a float rigidly affixed to the float arm. This is because the arrangements of the embodiments of FIGS. 10-12 include an additional range of motion of the float 3 corresponding to the pivot angle of the float 3 about the pin 83 or 87, in addition to the range of motion of the float arm 51 about its own pivot 37. This additional pivot angle would be included at both the upper and lower ends of the range of motion of the float arm 51.

It should also be noticed in the present embodiment that, similarly to the embodiment shown in FIGS. 10 and 11, the change-over valve can be operated in the two specific upper and lower positions without extending the connection section between the main arm 51 and the float 3.

It is to be understood that the above-described embodiments represent preferred constructions of the present invention. Other constructions are possible without falling outside of the scope of the present invention, which is defined according to the claims set forth below.

I claim:

1. A pump comprising:

a vessel, said vessel comprising a motive fluid inlet port, a motive fluid outlet port, a liquid inlet port and a liquid discharge port;

a motive fluid inlet valve for opening and closing said motive fluid inlet port and a motive fluid outlet valve for opening and closing said motive fluid outlet port, said motive fluid inlet valve opening said motive fluid inlet port when said motive fluid outlet valve closes said motive fluid outlet port and said motive fluid inlet valve closing said motive fluid inlet port when said motive fluid outlet valve opens said motive fluid outlet port;

a motive fluid valve actuation link connectable to said motive fluid inlet valve and said motive fluid outlet valve;

a float;

a main arm, said main arm being coupled to said float, said main arm comprising an angled section, said main arm being pivotally mounted in said vessel about a first pivot axis by a first pivot connection at said angled section;

a first arm, said first arm being pivotally mounted in said vessel, said motive fluid valve actuation link being connected to said first arm; and a resilient element, said resilient element being pivotally coupled to said main arm by a second pivot connection, said second pivot connection rotating about a second pivot axis, said resilient element also being pivotally coupled to said first arm by a third pivot connection, said third pivot connection rotating about a third pivot axis, wherein a distance between said first pivot axis and said third pivot axis is greater than a distance between said first pivot axis and said second pivot axis.

2. The pump of claim 1, wherein:

said resilient element is a compression spring.

3. The pump of claim 1, further comprising:

a float arm, said float being mounted on said float arm, said float arm being pivotally mounted in said vessel, said float arm being coupled to said main arm.

4. The pump of claim 3, further comprising:

a valve at said liquid discharge port, said valve being coupled to said float by a link pivotally coupled to said float arm and pivotally coupled to said valve.

5. The pump of claim 1, wherein:

said third pivot connection comprises a second arm pivotally connected to said resilient element and pivotally mounted on said first arm.

6. The pump of claim 1, wherein:

said second pivot connection comprises a second arm pivotally connected to said resilient element and pivotally mounted on said main arm.

7. The pump of claim 1, wherein:

said second pivot connection comprises a second arm pivotally connected to said resilient element and pivotally mounted on said main arm, and further comprising a crank arm pivotally connected to said resilient element and pivotally mounted on said first arm.

8. The pump of claim 1, wherein:

said float is pivotally mounted on said main arm.

9. The pump of claim 8, wherein:

said main arm comprises upper and lower faces and said float comprises a surface contacting said upper or said lower face upon pivoting of said float on said main arm.

10. The pump of claim 1, further comprising:

a shaft connected to said resilient element, said main arm comprising a slot, said shaft sliding in said slot to thereby prevent bending of said resilient element.

11. The pump of claim 1, further comprising:

a shaft connected to said resilient element, said first arm comprising a slot, said shaft sliding in said slot to thereby prevent bending of said resilient element.

12. A pump and trap comprising:

a vessel, said vessel comprising a motive fluid inlet port, a motive fluid outlet port, a liquid inlet port and a liquid discharge port;

a motive fluid inlet valve for opening and closing said motive fluid inlet port and a motive fluid outlet valve for opening and closing said motive fluid outlet port, said motive fluid inlet valve opening said motive fluid inlet port when said motive fluid outlet valve closes said motive fluid outlet port and said motive fluid inlet valve closing said motive fluid inlet port when said motive fluid outlet valve opens said motive fluid outlet port;

a motive fluid valve actuation link connectable to said motive fluid inlet valve and said motive fluid outlet valve;

a float;

a main arm, said main arm being coupled to said float, said main arm being pivotally mounted in said vessel about a first pivot axis by a first pivot connection;

a first arm, said first arm being pivotally mounted in said vessel, said motive fluid valve actuation link being connected to said first arm;

a resilient element, said resilient element being pivotally coupled to said main arm by a second pivot connection, said second pivot connection rotating about a second pivot axis, said resilient element also being pivotally coupled to said first arm by a third pivot connection, said third pivot connection rotating about a third pivot axis; and a valve at said liquid discharge port, said valve being coupled to said float by a link pivotally coupled to said float arm and pivotally coupled to said valve.

13. The pump and trap of claim 12, wherein:

said valve comprises upper and lower valve heads, said upper and lower valve heads being engageable with upper and lower valve seats at said liquid discharge port.

14. A pump and trap comprising:

a vessel, said vessel comprising a motive fluid inlet port, a motive fluid outlet port, a liquid inlet port and a liquid discharge port, said liquid discharge port comprising upper and lower valve seats;

a motive fluid inlet valve for opening and closing said motive fluid inlet port and a motive fluid outlet valve for opening and closing said motive fluid outlet port, said motive fluid inlet valve opening said motive fluid inlet port when said motive fluid outlet valve closes said motive fluid outlet port and said motive fluid inlet valve closing said motive fluid inlet port when said motive fluid outlet valve opens said motive fluid outlet port;

a motive fluid valve actuation link connectable to said motive fluid inlet valve and said motive fluid outlet valve;

a float;

a main arm, said main arm being coupled to said float, said main arm being pivotally mounted in said vessel about a first pivot axis by a first pivot connection;

a first arm, said first arm being pivotally mounted in said vessel, said motive fluid valve actuation link being connected to said first arm;

a resilient element, said resilient element being pivotally coupled to said main arm by a second pivot connection, said second pivot connection rotating about a second pivot axis, said resilient element also being pivotally coupled to said first arm by a third pivot connection, said third pivot connection rotating about a third pivot axis; and a valve at said liquid discharge port, said valve comprising upper and lower valve heads, said upper and lower valve heads being engageable with said upper and lower valve seats, disengagement of said upper valve head from said upper valve seat providing direct fluid communication between an interior of said vessel and said liquid discharge port, and disengagement of said lower valve head from said lower valve seat providing direct fluid communication between an interior of said vessel and said liquid discharge port.

15. The pump and trap of claim 14, wherein:

said valve is coupled to said float by a link pivotally coupled to said float arm and pivotally coupled to said valve.

16. An over-center snap link comprising:

a main arm, said main arm comprising an angled section, said main arm being pivoted about a first pivot axis by a first pivot connection at said angled section;

a first arm, said first arm being pivoted; and a resilient element, said resilient element being pivotally coupled to said main arm by a second pivot connection, said second pivot connection rotating about a second pivot axis, said resilient element also being pivotally coupled to said first arm by a third pivot connection, said third pivot connection rotating about a third pivot axis, wherein a distance between said first pivot axis and said third pivot axis is greater than a distance between said first pivot axis and said second pivot axis.

17. The over-center snap link of claim 16, wherein:

said resilient element is a compression spring.

18. The over-center snap link of claim 16, wherein:

said third pivot connection comprises a second arm pivotally connected to said resilient element and pivotally mounted on said first arm.

19. The over-center snap link of claim 16, wherein:

said second pivot connection comprises a second arm pivotally connected to said resilient element and pivotally mounted on said main arm.

20. The cover-center snap link claim 16, wherein:

said second pivot connection comprises a second arm pivotally connected to said resilient element and pivotally mounted on said main arm, and further comprising a crank arm pivotally connected to said resilient element and pivotally mounted or said first arm.

21. The over-center snap link of claim 16, further comprising:

a shaft connected to said resilient element, said main arm comprising a slot, said shaft sliding in said slot to thereby prevent bending of said resilient element.

22. The over-center snap link of claim 16, further comprising:

a shaft connected to said resilient element, said first arm comprising a slot, said shaft sliding in said slot to thereby prevent bending of said resilient element.

23. A pump comprising:

a vessel, said vessel comprising a motive fluid inlet port, a motive fluid outlet port, a liquid inlet port and a liquid discharge port;

a motive fluid inlet valve for opening and closing said motive fluid inlet port and a motive fluid outlet valve for opening and closing said motive fluid outlet port, said motive fluid inlet valve opening said motive fluid inlet port when said motive fluid outlet valve closes said motive fluid outlet port and said motive fluid inlet valve closing said motive fluid inlet port when said motive fluid outlet valve opens said motive fluid outlet port, said motive fluid inlet valve comprising a valve rod integrally formed with a valve head, said valve rod and valve head being accessible and removable from said vessel via an exterior of said vessel;

a motive fluid valve actuation link connectable to said motive fluid inlet valve and said motive fluid outlet valve, said motive fluid valve actuation link being detached from said valve head and valve rod to thereby allow said valve head and valve rod to be removable from said vessel via an exterior of said vessel;

a float; and a snap-over linkage connecting said float to said motive fluid valve actuation link.

24. A pump comprising:

a vessel, said vessel comprising a motive fluid inlet port, a motive fluid outlet port, a liquid inlet port and a liquid discharge port;

a motive fluid inlet valve for opening and closing said motive fluid inlet port and a motive fluid outlet valve for opening and closing said motive fluid outlet port, said motive fluid inlet valve opening said motive fluid inlet port when said motive fluid outlet valve closes said motive fluid outlet port and said motive fluid inlet valve closing said motive fluid inlet port when said motive fluid outlet valve opens said motive fluid outlet port;

a motive fluid valve actuation link connectable to said motive fluid inlet valve and said motive fluid outlet valve;

a float;

a main arm, said main arm being coupled to said float, said main arm being pivotally mounted in said vessel about a first pivot axis by a first pivot connection;

a first arm, said first arm being pivotally mounted in said vessel, said motive fluid valve actuation link being connected to said first arm;

a resilient element, said resilient element being pivotally coupled to said main arm by a second pivot connection, said second pivot connection rotating about a second pivot axis, said resilient element also being pivotally coupled to said first arm by a third pivot connection, said third pivot connection rotating about a third pivot axis, wherein a distance between said first pivot axis and said third pivot axis is greater than a distance between said first pivot axis and said second pivot axis; and a valve at said liquid discharge port, said valve being coupled to said float.

25. The pump of claim 24, wherein:

said valve comprises two valve elements and said liquid discharge port comprises two valve seats, each of said valve elements being engageable with one of said valve seats to thereby close said liquid discharge port.

26. The pump of claim 24, wherein:

said valve is coupled to said float by a link pivotally coupled to said float and pivotally coupled to said valve.

27. An over-center snap link comprising:

a main arm, said main arm comprising an angled section, said main arm being pivoted about a first pivot axis by a first pivot connection at said angled section;

a first arm, said first arm being pivoted; and a resilient element, said resilient element being pivotally coupled to said main arm by a second pivot connection, said second pivot connection rotating about a second pivot axis, said resilient element also being pivotally coupled to said first arm by a third pivot connection, said third pivot connection rotating about a third pivot axis.

* * * * *